(No Model.) 2 Sheets—Sheet 1.

G. ERKENZWEIG.
ROLLING MILL.

No. 281,474. Patented July 17, 1883.

Attest:
Wm. G. Sayers
Harry E. Knight

Inventor.
Gustav Erkenzweig
By Knight Bros
attys (No Model.) 2 Sheets—Sheet 2.
G. ERKENZWEIG.
ROLLING MILL.
No. 281,474. Patented July 17, 1883.
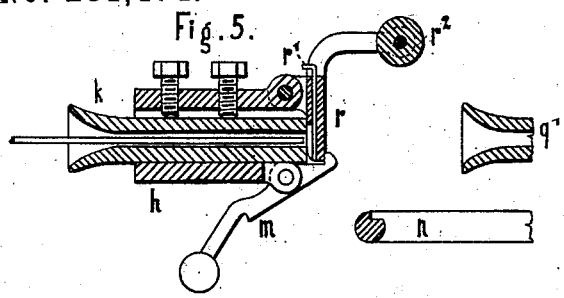
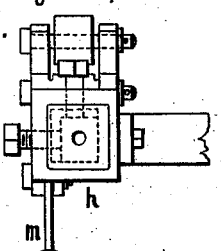
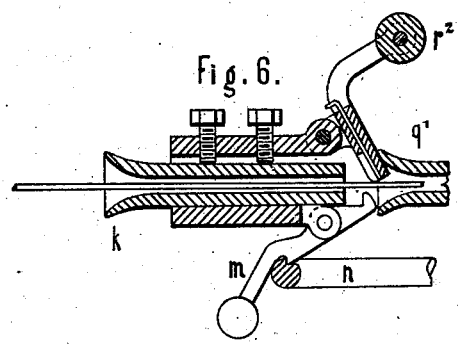
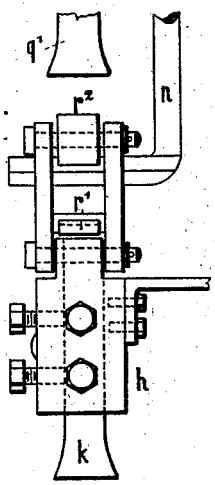
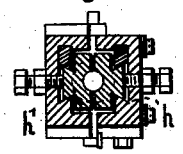
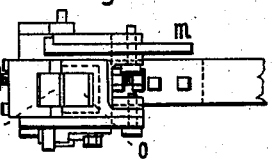
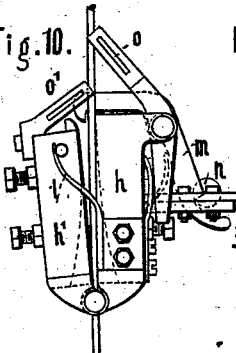
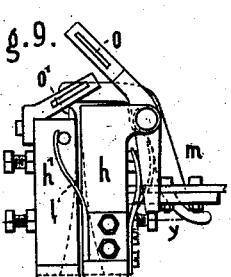
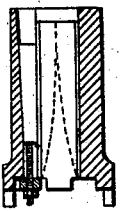
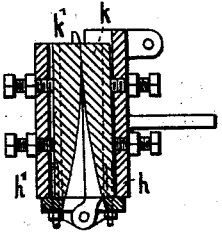
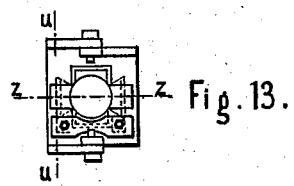
Inventor,
Gustav Erkenzweig
By Knight Bros
attys
Attest.
Wm. H. Sayers
Harry E. Knight

UNITED STATES PATENT OFFICE.

GUSTAV ERKENZWEIG, OF HAGEN, PRUSSIA, GERMANY.

ROLLING-MILL.

SPECIFICATION forming part of Letters Patent No. 281,474, dated July 17, 1883.

Application filed December 16, 1882. (No model.)

*To all whom it may concern:*

Be it known that I, GUSTAV ERKENZWEIG, engineer, residing in Hagen, Kingdom of Prussia, German Empire, have invented new and useful Improvements in Rolling-Mills, of which the following is a specification.

My invention relates to rolling-mills for manufacturing rods of iron or steel of small size, such as iron wire, hoop-iron, &c.; and its subject-matter consists in an apparatus by which such rods are conducted automatically, during the rolling process, from one pair of rolls to another, placed laterally to the former and rotating in opposite direction, this operation, which is technically called "turning-in," having hitherto always been carried out by hand.

Figure 1:
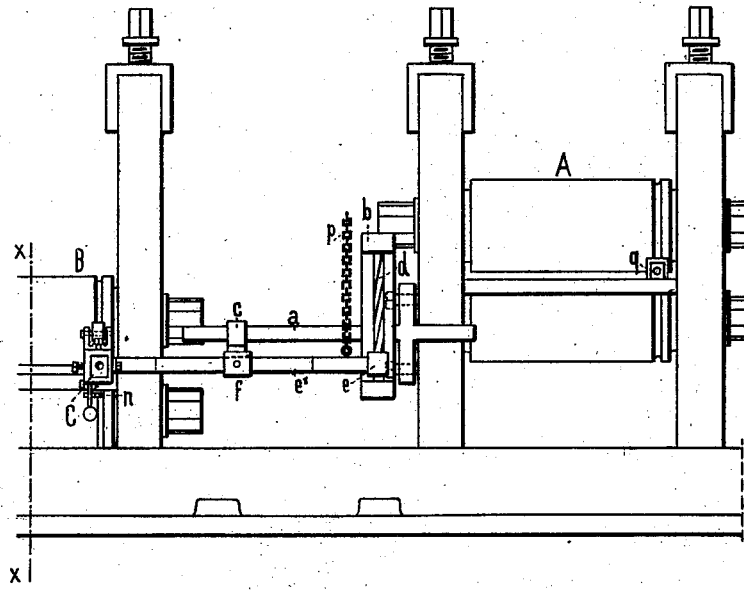
Figure 3:
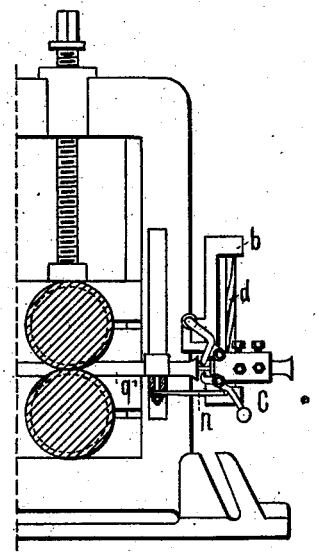
Figure 2:
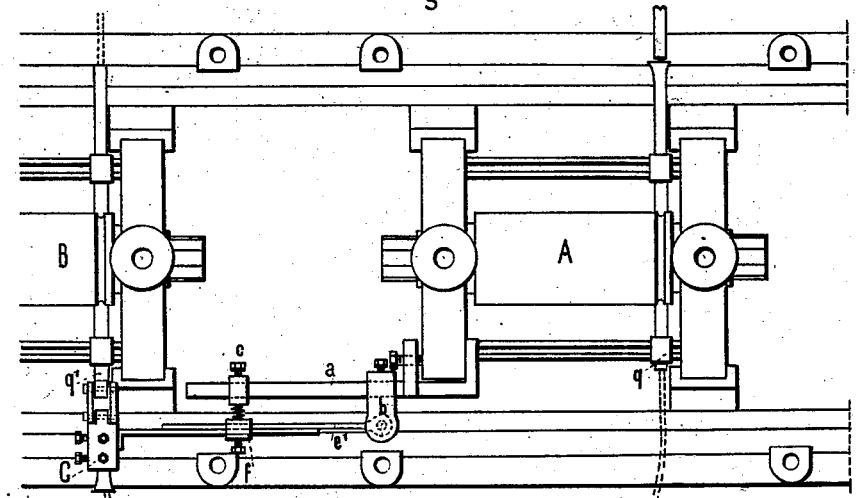
Figure 4:
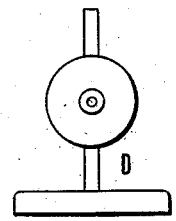

On the annexed two sheets of drawings, Figure 1 shows in front elevation and Fig. 2 in plan two pairs of rolls of a rolling train fitted with my automatic guide. Fig. 3 is a sectional end view thereof on line $x\, x$, Fig. 1. Fig. 4 represents a roller serving to support the rod while being rolled. Figs. 5 and 6 show the piece C, Figs. 1, 2, and 3, or guide proper, in section, with different positions of the movable parts. Fig. 7 is an end view of the same piece from the left-hand side of Fig. 5, and Fig. 8 a plan. Figs. 9 to 15 represent a guide of modified construction, Figs. 9 and 10 being each a plan with different position of movable parts; Fig. 11, a section on line $y\, y$, Fig. 9; Figs. 12 and 13, end views, respectively, from the back and the front end; and Figs. 14 and 15, sections on the lines $z\, z$ and $u\, u$, respectively, of Fig. 13.

To a standard of one pair of rolls—for instance, the rolls A—is fixed at a suitable height a horizontal bar, $a$, on which is adjustably secured a bracket, $b$, carrying a vertical spindle, $d$. Turning on this spindle $d$ is a boss, $e$, having an arm, $e'$, to the end of which is attached the guiding-piece C. The arm $e'$ is by preference made of two flat bars arranged to be shifted upon each other, and secured together by a socket, $f$, and a set-screw, so that the length of the arm may be varied at will.

The guiding-piece or guide C (shown on a larger scale in Figs. 5 to 8) consists, in the first place, of a hollow block of iron, $h$, in which, by preference, a bush or lining, $k$, is fixed by set-screws or in other suitable manner. The bore or hole of the said bush (or of the block itself when the bush is not used) is widened at the end where the rod which is being rolled enters. At its other end the block is provided with a plate, $r$, pivoted thereto, and pressed against its end surface by a weight, $r^2$, or a spring, this plate being ordinarily kept locked by a lever or locking-pawl, $m$, also pivoted to the block $h$, and operating by means of a weight or a spring. Instead of this lever, any other locking device acting by gravity or the force of a spring may, however, be employed.

$r'$ is a steel lining-plate so arranged that it may be easily exchanged, and $n$ a bar, stud, or stop fixed in front of the receiving-rolls and serving to disengage the lever $m$ from the plate $r$. In case the different pairs of rolls are placed at the same height, the arrangement as described is substantially complete. After due adjustment of the various parts in respect to the grooves to be put in relation to each other the guide will, at one end of its semicircular course, be opposite to the groove which delivers the rod undergoing the rolling process, while at the other end it will be in front of the receiving-groove. The different pairs of rolls are, however, usually placed at different heights, so that while one roll of each pair is in a line with a roll of the neighboring pair, the other rolls are alternately arranged above and below the former, such relative position being preferred in order to obtain a simple disposition of pairs of rolls working alternately in opposite directions. This difference in height requires the guide to rise or to descend during its course, and for imparting to it such motion the spindle $d$ and the boss $e$ are provided, respectively, with outside and inside screw-threads, the pitch whereof is equal to double the diameter of a roll, and which have a left or a right hand direction, as may be required.

In case a rod is to be conducted from a pair of rolls, A, Fig. 1, to a pair, B, placed lower than A, the apparatus is suspended to a chain, $p$, passing over a pulley and carrying a weight, or attached to a spring adapted to lift the apparatus. This weight or spring will have the effect of turning the apparatus on the screw-threaded spindle $d$, and of keeping it, while it is not operating, opposite to the tube q, Figs. 1 and 2, which is arranged in a line with the delivering-groove of the rolls A. If, on the other hand, the rod is to be conducted to a pair of rolls placed higher than the delivering pair, the weight of the apparatus itself tends to bring the same back to its position of rest.

The guide C being in its receiving position, the bush k will be with its open end opposite to the outlet end of the conducting-tube q, fixed to the frame of the delivering-rolls A, and the plate r will be closed and locked. When a rod then passes out from between the rolls A and enters into the guide C, it presses against the plate r and swings the guide around on the spindle d. On account of the screw-threads with which the spindle is provided, the guide will, however, move in a helical line, and in traveling over a semicircle it will be lowered or raised, according to the direction of the said screw-threads, the extent of its vertical motion being equal to the diameter of a roll, as the pitch of the threads amounts to the double thereof. In order to prevent the hot and therefore pliant rod from dropping to the ground meanwhile, and from slipping out of the guide, a number of rollers, D, Figs. 2 and 4, or other supporting devices are arranged on its path. A spring-buffer, c, against which the arm e' strikes, is fixed upon the bar a, or in any other suitable place, for the purpose of stopping the motion of the apparatus without violent concussion. Upon the arrival of the guide opposite to the receiving-groove, the locking-pawl or lever m strikes against the fixed stud or bar n. This causes the lever to turn on its pivot and to unlock the plate r. At the same time the guide is maintained in this position by the end of the lever m, which also, forming a pawl, catches into a notch cut into the stud or bar n. The plate r having become free, the rod pressing against the same will open it, and thereupon pass into the conducting-tube q', leading to the groove of the receiving-rolls B. After the rod has completely passed the guide, the weight $r^2$ causes the plate r to close again, while the pawl or lever m relocks it. Simultaneously by the action of the plate on the lever the latter is disengaged from the bar or stud n. The apparatus is thereupon brought back to its normal position, either by the weight or the spring arranged for this purpose, or by its own weight, in the manner hereinbefore stated.

The described apparatus may also be used when vertical pairs of rolls are combined with horizontal pairs, as is sometimes the case.

Instead of using a screw-threaded spindle for producing the ascending or descending motion of the guide C during its circular movement, a helical or inclined guiding-way having the spindle for its axis may be arranged at any convenient distance therefrom, while the arm e' is provided with a roller running on the said way. In such case the spindle d and the boss e may be replaced by a ball-and-socket or other universal joint, by which the arm e' is connected to the bracket b. Another modification consists in fixing the arm to a plain spindle and inclining the latter so much as is required to conduct the guide C from the delivering-groove to the receiving-groove, and vice versa.

The modified guide represented by Figs. 9 to 15 consists of two parts, h and h', by preference fitted with the linings k and k', fixed therein by means of dovetail ledges, keys, and set-screws, as shown in the drawings. These linings, which are made of steel or chilled cast-iron, are provided with a funnel-shaped bore for the insertion of the end of the rod to be operated upon, one-half of said bore being formed in each section of said lining. The said bore is considerably contracted toward its outlet end, or its sides run tapering together until they meet, so that while the guide is closed the rod will jam itself in the same. At the end of the guide at which the rod enters, the two parts h and h' are hinged to each other, and a spring, l, serves to press them together. This form of guide is also provided with a locking-pawl, m, one end of which, forming a hook, engages by the action of a spring with a projection on the part h', so as to keep the guide closed while it conducts the rod from one pair of rolls to the other. o and o' are steel scrapers fixed in forked arms, and serving to scrape the scale off the rod during its passage. The scraper o is pivoted by its arm to the part h, and pressed against the rod by a special spring, whereas the scraper o', the arm whereof is fixed to the part h', operates by the power of the spring l. By this guide the rod is conducted from one pair of rolls to the other in a similar manner as in the first case; but when the lever m, on the arrival of the guide near the rolls B, strikes on the stud or bar n, the part h', becoming free from the hook of the lever is pushed sidewise by the rod. The latter in advancing first passes between the scrapers o o' for the purpose stated, and then enters into the tube q', which leads it to the receiving-groove. After the passage of the rod the guide is reclosed by the spring l and locked again by the lever m. Simultaneously this lever is disengaged from the stud or bar n, where it had become caught, so that the apparatus can then return to its position of rest.

The guide may yet be modified by having its plane of division arranged horizontally. In this case it would be possible to replace the spring acting on the lever m by a weight attached to the tail end of the lever, as in Fig. 5.

I claim as my invention—

1. The combination, with a rolling-train comprising two or more pairs of rolls, arranged substantially as described, of a hollow swinging guide moving in a curved line in conveying the end of the bar to be operated upon from a point opposite the delivery-groove to a point in front of the receiving-groove, a part of the guide being hinged and arranged to be automatically locked and released, by which means the end of the rod to be conducted is retained in the bore of the guide until the latter has completed its course, and is then permitted to pass through the guide into the receiving-groove, substantially as shown and described.

2. The combination, with a rolling train, of a hollow swinging guide, C, supported by an adjustable arm, $e'$, having an internally-screw-threaded boss, $e$, engaging with a screw-threaded spindle, $d$, substantially as and for the purposes set forth.

3. The swinging guide C, divided longitudinally into two parts, hinged together at their rear ends, and having a central tapering or conical bore, in combination with a locking device arranged to automatically lock and unlock the delivery end of said guide, substantially as set forth.

4. The swinging guide C, provided with a locking-pawl, $m$, which on striking against a fixed bar or stud, $n$, catches into a notch cut into the latter, as and for the purpose specified.

5. The combination, with a rolling train, of an automatic swinging guide, C, having scrapers $o$ $o'$ for removing the scales from the metal, substantially as set forth.

6. In a rolling train, a swinging guide, C, having a removable bushing provided with a central bore, in combination with an automatic locking device for closing the end of said bore, substantially as set forth.

7. In a rolling train, the combination, with a swinging guide, of a series of supporting-rolls, D, substantially as and for the purposes set forth.

In testimony whereof I have signed my name to this specification in the presence of two subscribing witnesses.

GUSTAV ERKENZWEIG.

Witnesses:
  CARL FERIÉ,
  EDUARD KNEIREL.